United States Patent
Kim et al.

(10) Patent No.: US 10,568,188 B2
(45) Date of Patent: Feb. 18, 2020

(54) ON-DEMAND STREET LIGHTING FOR A CONNECTED VEHICLE

(71) Applicant: TOYOTA JIDOSHA KABUSHIKI KAISHA, Toyota-shi, Aichi-ken (JP)

(72) Inventors: BaekGyu Kim, Mountain View, CA (US); Chung-Wei Lin, Mountain View, CA (US); Shinichi Shiraishi, Mountain View, CA (US)

( * ) Notice: Subject to any disclaimer, the term of this patent is extended or adjusted under 35 U.S.C. 154(b) by 16 days.

(21) Appl. No.: 15/939,252

(22) Filed: Mar. 28, 2018

(65) Prior Publication Data

US 2019/0306956 A1 Oct. 3, 2019

(51) Int. Cl.
| | |
|---|---|
| *H05B 37/02* | (2006.01) |
| *H04W 4/44* | (2018.01) |
| *H04B 10/112* | (2013.01) |
| *G05D 1/00* | (2006.01) |

(52) U.S. Cl.
CPC ....... *H05B 37/0272* (2013.01); *G05D 1/0088* (2013.01); *H04B 10/1129* (2013.01); *H04W 4/44* (2018.02)

(58) Field of Classification Search
None
See application file for complete search history.

(56) References Cited

U.S. PATENT DOCUMENTS

| | | | | |
|---|---|---|---|---|
| 6,092,911 A | * | 7/2000 | Baker, III | A62C 27/00 169/24 |
| 6,191,531 B1 | * | 2/2001 | Reime | B60Q 1/1423 315/82 |
| 6,422,714 B1 | * | 7/2002 | Hubbell | G09F 13/22 362/145 |
| 8,922,124 B2 | * | 12/2014 | Reed | H05B 37/02 315/152 |
| 2009/0262189 A1 | * | 10/2009 | Marman | G08B 13/19613 348/143 |
| 2012/0235567 A1 | * | 9/2012 | Karalis | H03H 7/40 315/70 |
| 2014/0210646 A1 | * | 7/2014 | Subramanya | B61L 29/28 340/928 |
| 2014/0317029 A1 | * | 10/2014 | Matsuoka | G05B 15/02 706/12 |

FOREIGN PATENT DOCUMENTS

KR 101044224 6/2011

* cited by examiner

*Primary Examiner* — Ramesh B Patel
(74) *Attorney, Agent, or Firm* — Burbage Law, P.C.; Jon-Michael Burbage; Elizabeth Ruzich

(57) ABSTRACT

The disclosure includes embodiments for providing on-demand street lighting for a connected vehicle. In some embodiments, a method includes controlling an operation of a street light based on a lighting policy and a presence of a connected vehicle. In some embodiments, the street light is operated consistent with the lighting policy. In some embodiments, the presence of the connected vehicle is determined based on a receipt of a wireless message that is transmitted by the connected vehicle. In some embodiments, the lighting policy is operable to reduce an energy consumption of the street light while also providing illumination for the connected vehicle.

20 Claims, 6 Drawing Sheets

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 5

BSM DATA 195

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type
A unique identifier of the vehicle (e.g., a VIN number)

Figure 6

ON-DEMAND STREET LIGHTING FOR A CONNECTED VEHICLE

BACKGROUND

The specification relates to on-demand street lighting for a connected vehicle.

Many fatal accidents occur at night. Fatal crashes are four times higher at night than during the day. The major cause of these nighttime fatal accidents is limited visibility of objects such as other vehicles and pedestrians. Proper street lighting can substantially reduce fatalities and crashes with pedestrians and other vehicles. Studies have shown that proper street lighting can substantially reduce fatalities and crashes with pedestrians and lighted intersections and highways have fewer crashes than their unit counterparts.

However, it is not economically efficient to turn on the street lights throughout the night due to significant energy cost. In United States, studies indicate that municipal street lighting can represent from 5% to over 60% of a municipal government's electric bill depending on the municipality's size, the services it offers, and the efficiency of its public lighting. In India, one study indicates that 17% of a municipality's total annual bill is due to street lighting.

Typically, a rural or suburban area has very low traffic at night (e.g., midnight to 4:00 AM), so it is not efficient to turn on streetlights throughout the entire night.

SUMMARY

Described herein are embodiments of a light system that uses wireless vehicle-to-infrastructure (V2I) communication to enable to control when streetlights turn on at night. The embodiments described herein reduce the energy cost of street lighting while also reducing fatalities and crashes by vehicles, especially those which occur in low traffic situations at night time. In particular, embodiments described herein include software which causes street lights to be automatically turned on and off upon a vehicle's' arrival and departure to or from the region where those street lights are located.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: controlling an operation of a street light based on a lighting policy and a presence of a connected vehicle, where the street light is operated consistent with the lighting policy, the presence of the connected vehicle is determined based on a receipt of a wireless message that is transmitted by the connected vehicle, and the lighting policy is operable to reduce an energy consumption of the street light while also providing illumination for the connected vehicle. Other embodiments of this aspect include corresponding computer systems, apparatus, and computer programs recorded on one or more computer storage devices, each configured to perform the actions of the methods.

Implementations may include one or more of the following features. The method where the wireless message is a Dedicated Short-Range Communication (DSRC) message. The method where the DSRC message is not one of the following: a WiFi message; a 3G message; a 4G message; a Long-Term Evolution (LTE) message; a millimeter wave communication message; a Bluetooth message; and a satellite communication. The method where the lighting policy is determined by a cloud server. The method where the street light does not receive the wireless message. The method where the wireless message is received by an edge server that is communicatively coupled to the street light and operable to control the operation of the street light consistent with the lighting policy. The method where the lighting policy is determined at least in part on a preference of a user of the connected vehicle. The method where the connected vehicle is an autonomous vehicle. Implementations of the described techniques may include hardware, a method or process, or computer software on a computer-accessible medium.

One general aspect includes a system including: a processor communicatively coupled to a non-transitory memory storing computer code that is operable, when executed by the processor, to cause the processor to control an operation of a street light based on a lighting policy and a presence of a connected vehicle, where the street light is operated by the processor consistent with the lighting policy, the presence of the connected vehicle is determined based on a receipt of a wireless message that is transmitted by the connected vehicle, and the lighting policy is operable to reduce an energy consumption of the street light while also providing illumination for the connected vehicle. Other embodiments of this aspect include corresponding computer systems, apparatus, and computer programs recorded on one or more computer storage devices, each configured to perform the actions of the methods.

Implementations may include one or more of the following features. The system where the lighting policy is determined by a cloud server. The system where the wireless message is received by an edge server that is communicatively coupled to the street light and operable to control the operation of the street light consistent with the lighting policy. The system where the operation of the street light is not controlled based on a signal from a photovoltaic cell indicating a state of ambient light. The system where the presence of the connected vehicle is not determined based on an image of the connected vehicle, or any other measurement recorded by the connected vehicle. Implementations of the described techniques may include hardware, a method or process, or computer software on a computer-accessible medium.

One general aspect includes a computer program product including instructions that, when executed by one or more processors, cause the one or more processors to perform operations including: controlling an operation of a street light based on a lighting policy and a presence of a connected vehicle, where the street light is operated consistent with the lighting policy, the presence of the connected vehicle is determined based on a receipt of a wireless message that is transmitted by the connected vehicle, and the lighting policy is operable to reduce an energy consumption of the street light while also providing illumination for the connected vehicle. Other embodiments of this aspect include corresponding computer systems, apparatus, and computer programs recorded on one or more computer storage devices, each configured to perform the actions of the methods.

Implementations may include one or more of the following features. The computer program product where the lighting policy is determined by a cloud server. The computer program product where the street light generates energy data describing an energy usage of the street light and the energy data is provided to the cloud server in a feedback loop so that the lighting policy is revised based on the energy usage of the street light so that the energy usage is reduced while still providing sufficient illumination for the connected vehicle. The computer program product where the connected vehicle is a Highly Autonomous Vehicle (HAV) and the lighting policy is configured based on an illumination requirement for an onboard sensor of the connected vehicle. The computer program product where the connected vehicle is an autonomous vehicle that is not an HAV and the lighting policy is configured based on an illumination requirement for an onboard sensor of the connected vehicle. The computer program product where the connected vehicle is an autonomous vehicle and the operation of the street light improves a performance of the connected vehicle by enabling one or more onboard sensors of the connected vehicle to perceive a roadway environment that includes the street light and the connected vehicle because the lighting policy is configured based on one or more illumination requirements for the one or more onboard sensors of the connected vehicle. The computer program product where the one or more illumination requirements for the one or more onboard sensors are wirelessly communicated by the connected vehicle to an edge server that includes the one or more processors that perform the operation of controlling the operation of the street light. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5 and 6 are block diagrams illustrating an example of Basic Safety Message (BSM) data according to some embodiments.

DETAILED DESCRIPTION

In some embodiments, the light system includes a system architecture having the following three layers: (1) a cloud server: (2) one or more edge servers; and (3) one or more street lights. Each of these three layers of the system architecture includes a software client which enables the embodiments to provide their functionality.

In some embodiments where a vehicle subscribes to the light service provided by the light system, the vehicle itself also includes a software client that enables a driver of the vehicle to subscribe to the light service; in these embodiments, the vehicle is a fourth layer of the system architecture. Each layer of the system architecture includes its own software client.

Figure 1:
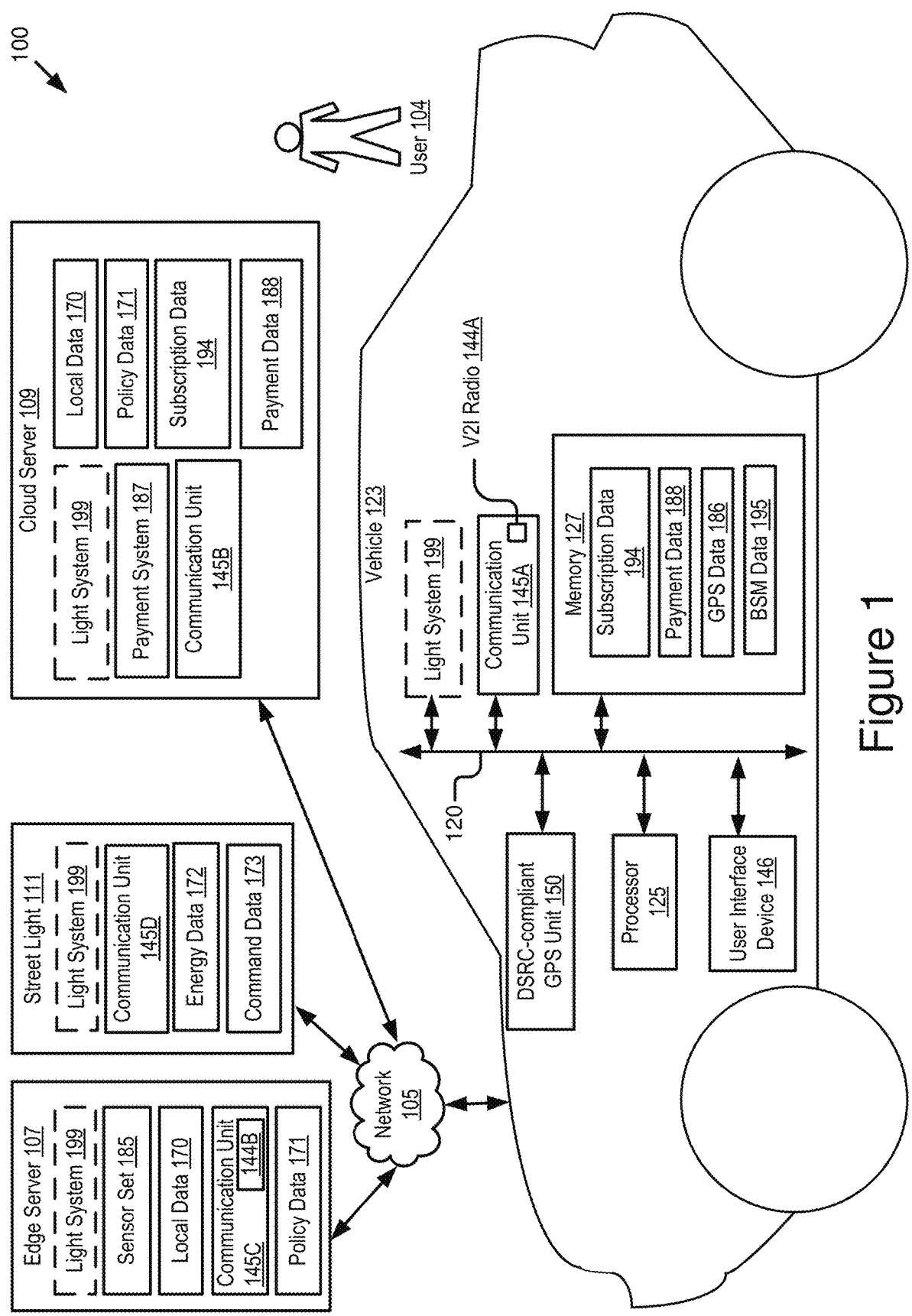
FIG. 1 is a block diagram illustrating an operating environment for a light system according to some embodiments.

Referring to FIG. 1, an embodiment is depicted including a network having the following endpoints: a vehicle; a cloud server; an edge server; and a street light. Each of these endpoints includes a light system. In some embodiments, each of these endpoints is a different layer in the system architecture described herein and each endpoint includes a software client that enables that endpoint to provide its functionality to the system architecture. In some embodiments, the light system for each endpoint includes the software client for that endpoint. For example, as depicted in FIG. 1: the light system of the vehicle is the software client for that endpoint; the light system of cloud server is the software client for that endpoint; the light system of the edge server is the software client for that endpoint; and the light system of the street light is the software client for that endpoint. The light systems are depicted in FIG. 1 with dashed lines, and as being located at various endpoints, to indicate that, in some embodiments, different endpoints include a non-transitory memory storing code and routines that includes some or all of the light system so that the functionality of the light system is distributed among the endpoints of the embodiment depicted in FIG. 1. The cloud server, edge server and street light are now briefly described according to some embodiments.

In some embodiments, the cloud server maintains a range of lighting policies. The lighting policies are described by policy data that is stored on a non-transitory memory of the cloud server which is not depicted in FIG. 1. Policy data is digital data that: (1) identifies one or more geographic regions; and (2) a lighting policy for each identifies geographic region that specifies one or more conditions when street lights in a particular geographic region should be turned on or off. In this way, the policy data describes the lighting policy for one or more geographic regions. The light system of the cloud server updates the lighting policies described by the policy data and sends the policy data to the edge server via the network.

In some embodiments, the edge server is a small processor-based computing device (e.g., a roadside unit) that is located in close proximity to multiple street lights and controls their state (whether they are on or off) with short latency (e.g., a latency equal to 0.1 milliseconds, 0.5 milliseconds, 0.8 picoseconds, 0.1 nanoseconds, 1 second, 5 seconds or some other similar interval). The edge server receives policy data from the network describing a lighting policy. The edge server receives new instances of policy data at a regular interval (e.g., hourly or daily). The light system of the edge server controls the state of the street lights in accordance with the lighting policy described by the policy data most recently received from the network.

In some embodiments, the edge server is equipped with a wireless communication module that is operable to exchange wireless messages with approaching vehicles and provide street lighting for these vehicles based on the lighting policy and the presence of the vehicle (and, optionally, the preferences of the driver). Individual edge servers communicate with other adjacent edge servers to inform one another about a trajectory of a vehicle so edge servers that are being approached by the vehicle can prepare the street lighting of the roadway environment accordingly.

In some embodiments, the street lights are equipped with a wired or wireless communication module that is operable to receive control commands (e.g., a command specifying whether the street light should be on or off, its brightness level if on, its color if on, its lighting direction if on) from the light system of an edge server. The edge server may be installed in existing infrastructure hardware such as a roadside unit or the street light itself. Note that it is unnecessary for the street light to be equipped with a wireless communication module that enables the street light to communicate directly with the vehicle. A light system of the street light controls the operation of the street light based on control messages that are provided to the street light by the light system of an edge server that is proximate to the street light. The control messages specify a state for the street light (e.g., on or off) and variables for its operation when it is on (e.g., brightness level, color, direction, etc.).

For example, if the light system of the edge server provides a control message indicating that a street light is to be illuminated at 50% brightness relative to the potential brightness of the street light, then the light system of the street light controls the operation of the street light so that it is illumined at 50% brightness until a new control message is received from the edge server that specifies that the street light is to be turned off.

In some embodiments, the vehicle including the light system is a connected vehicle that wirelessly communicates with the edge server including the light system using V2I communication. Examples of V2I communication include one or more of the following: Dedicated Short-Range Communication (DSRC); Long-Term Evolution (LTE); millimeter wave communication; 3G; 4G; 5G LTE-Vehicle-to-Infrastructure (LTE-V2I); LTE-Device-to-Device (LTE-D2D); Voice over LTE (VoLTE); etc.

In some embodiments, the vehicle that includes the light system is a DSRC-equipped vehicle. A DSRC-equipped vehicle is a vehicle which includes a DSRC radio and is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC message is a wireless message that is specially configured to be send and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. For example, FIGS. 5 and 6 depict an example of a permissible payload for a particular type of DSRC message referred to as a BSM message. The wireless messages of key fobs as a component of a remote keyless entry system are not DSRC messages because they do not include a payload which is permissible under the DSRC standard. An example of a payload which is permissible under the DSRC standard is BSM data, embodiments of which are depicted in FIGS. 5 and 6. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring to FIG. 1, depicted is an operating environment 100 for a light system 199 according to some embodiments. As depicted, the operating environment 100 includes the following elements: a vehicle 123; a cloud server 109; an edge server 107; and a street light 111. These elements are communicatively coupled to one another by a network 105. The vehicle 123 includes a user 104. The user 104 may be a driver of the vehicle 123, or if the vehicle 123 is an autonomous vehicle, then the user 104 is an operator or passenger of the vehicle 123.

Although one vehicle 123, one cloud server 109, one edge server 107, one street light 111 and one network 105 are depicted in FIG. 1, in practice the operating environment 100 may include one or more vehicles 123, one or more cloud servers 109, one or more edge servers 107, one or more street lights 111 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

The following are endpoints of the network: the vehicle 123; the edge server 107; the street light 111; and the cloud server 109. Each of these endpoints may include an instance of the light system 199. The light systems 199 of the endpoints cooperate with one another to provide a light service to the vehicle 123, and thereby improve the operation of the vehicle 123 by reducing the likelihood of the vehicle 123 being involved with a nighttime collision or a nighttime fatal accident. This benefit of the light systems 199 is particularly advantageous for autonomous vehicles that are not operated by a human user 104 of the vehicle 123. In some embodiments, the light service provided by the light systems 199 includes one or more of: a local event-based lighting policy (see, e.g., FIG. 3); and a subscription-based lighting policy (see, e.g., FIG. 4).

In some embodiments, the vehicle 123 is a connected vehicle that is operable to wirelessly communicate with other endpoints of the network 105 using the network 105. In some embodiments, the vehicle 123 is a DSRC-equipped vehicle. The network 105 may include a DSRC communication channel shared among the vehicle 123 and the edge server 107. Because the edge server 107 controls the operation of the street light 111, in some embodiments there is no need for the vehicle 123 to share a DSRC communication channel with the street light 111.

The vehicle 123 is any type of vehicle. For example, the vehicle 123 is one of the following types of vehicles: a car; a truck; a sports utility vehicle; a bus; a semi-truck; a robotic car; a drone or any other roadway-based conveyance.

In some embodiments, the vehicle 123 is an autonomous vehicle or a semi-autonomous vehicle. For example, the vehicle 123 includes a set of Advanced Driver Assistance Systems (a set of "ADAS systems") which provide autonomous features to the vehicle 123 which are sufficient to render the vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems installed in a vehicle have no vehicle control. The set of ADAS systems may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgment). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments one or more of the vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the light system 199 improves the performance of an HAV by ensuring that the street light 111 provides an amount of illumination that is configured to be sufficient light for one or more onboard sensors of the HAV to provide its functionality, and thereby cause the HAV to operate more safely than it would without the light system 199 being implemented. Unlike a Level 0 vehicle that relies on a driver's eyes for vision so that the driver knows how to maneuver the Level 0 vehicle, an autonomous vehicle (e.g., generally an HAV, but possibly a Level 1 or Level 2 autonomous vehicle given the correct combination of ADAS systems) is fully reliant on sensor inputs provided by the onboard sensors of the autonomous vehicle (e.g., LIDAR, cameras, etc.) to perform driving maneuvering. An autonomous vehicle may be equipped with various types of sensors. Some sensors are operable to detect objects even in low brightness, while some sensors are not operable to detect objects in low brightness. Depending on the sensor type, a particular sensor's detection accuracy significantly drops when the surrounding environment is not bright enough. Accordingly, some autonomous driving features need to be deactivated when an autonomous vehicle enters a region with inadequate brightness for these autonomous features to property function. In this situation, the light system 199 of the edge server 107 and the light system 199 of the vehicle 123 (which is an autonomous vehicle) are operable to communicate with one another via V2I communication so that the light system 199 of the edge server 107 can learn about the illumination requirements of the onboard sensors of the vehicle 123 to provide a level of illumination that is operable to enable the correct operation of some or all of the autonomous features of the vehicle 123 when these autonomous features would have been deactivated due to inadequate illumination.

For example, if the vehicle 123 is equipped with an onboard sensor that provides sensor data that is inaccurate in dark environments, then the light system 199 of the vehicle 123 provides a V2I message to the edge server 107 via the network that includes digital data that describes the illumination requirements of the onboard sensor based on, for example, a design specification of the onboard sensor. For example, the memory 127 of the vehicle 123 may store specification data that is digital data that describes the illumination requirements for the onboard sensor, and the light system 199 of the vehicle 123 may cause the communication unit 145 of the vehicle to transmit a V2I message including the specification data to the edge server 107 via the network 105. The light system 199 of the edge server 107 includes code and routines that are operable, when executed by a processor of the edge server 107, to analyze the specification data to determine an appropriate level of brightness for operating the street light 111 based on the policy data 171 and the specification data so that the street light 111 is operated in a manner that satisfies both the policy data 171 and the illumination requirements (i.e., a lighting requirement) of the onboard sensor of the vehicle 123, and then generate command data 173 that instructs the street light 111 to operate in a manner that provides this appropriate level of brightness. The light system 199 then provides the command data 173 to the street light 111 so that the street light 111 is operated in a manner that satisfies both the policy data 171 and the illumination requirements of the onboard sensor of the vehicle 123. In this way, the light system 199 of the edge server 111 is operable to activate a street light to provide a sufficient amount of brightness so that the vehicle 123 can provide more autonomous features while also minimizing the energy consumption caused by operating the street light 111. In other words, the light system 199 is operable to dynamically change the operation (e.g., brightness) of the street light 111 so that the autonomous features of the vehicle 123 perform normally (e.g., based on the design specification for the ADAS systems and sensors that provide this autonomous feature) while also not providing any more illumination than is needed for these autonomous features to perform normally.

In some embodiments, the vehicle 123 includes the following elements: a processor 125; a memory 127; a communication unit 145A including a V2I radio 144A; a DSRC-compliant GPS unit 150; a user interface device 146; and a light system 199. These elements of the vehicle 123 are communicatively coupled to one another via a bus 120. Although not depicted as such in FIG. 1, in embodiments the vehicle includes a set of onboard vehicle sensors such as the sensor set 185.

In some embodiments, the processor 125 and the memory 127 may be elements of an onboard vehicle computer system (such as computer system 200 described below with reference to FIG. 2). The onboard vehicle computer system may be operable to cause or control the operation of the light system 199 of the vehicle 123. The onboard vehicle computer system may be operable to access and execute the data stored on the memory 127 to provide the functionality described herein for the light system 199 of the vehicle 123 or its elements (see, e.g., FIG. 2). The onboard vehicle computer system may be operable to execute the light system 199 which causes the onboard vehicle computer system to execute one or more steps of one or more of the flow processes 300, 400 described below with reference to FIGS. 3 and 4.

In some embodiments, the processor 125 and the memory 127 may be elements of an onboard unit. The onboard unit includes an electronic control unit (herein "ECU") or an onboard vehicle computer system that may be operable to cause or control the operation of the light system 199. The onboard unit may be operable to access and execute the data stored on the memory 127 to provide the functionality described herein for the light system 199 or its elements. The onboard unit may be operable to execute the light system 199 which causes the onboard unit to execute one or more steps of one or more of the flow processes 300, 400 described below with reference to FIGS. 3 and 4. In some embodiments, the computer system 200 depicted in FIG. 2 is an example of an onboard unit.

In some embodiments, the DSRC-compliant GPS unit 150 includes any hardware and software necessary to make the vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data 186 describing the location of the vehicle 123 with lane-level accuracy. For example, the vehicle 123 is traveling in a lane of a roadway. Lane-level accuracy means that the location of the vehicle 123 is described by the GPS data 186 so accurately that the vehicle's 123 lane of travel within the roadway may be accurately determined based on the GPS data 186 for this vehicle 123 as provided by the DSRC-compliant GPS unit 150.

In some embodiments, the DSRC-compliant GPS unit 150 includes hardware that wirelessly communicates with a GPS satellite to retrieve GPS data 186 that describes the geographic location of the vehicle 123 with a precision that is compliant with the DSRC standard. The DSRC standard requires that GPS data 186 be precise enough to infer if two vehicles (one of which is, for example, the vehicle 123) are located in adjacent lanes of travel. In some embodiments, the DSRC-compliant GPS unit 150 is operable to identify, monitor and track its two-dimensional position within 1.5 meters of its actual position 68% of the time under an open sky. Since driving lanes are typically no less than 3 meters wide, whenever the two-dimensional error of the GPS data 186 is less than 1.5 meters the light system 199 described herein may analyze the GPS data 186 provided by the DSRC-compliant GPS unit 150 and determine what lane the vehicle 123 is traveling in based on the relative positions of two or more different vehicles (one of which is, for example, the vehicle 123) traveling on the roadway at the same time.

By comparison to the DSRC-compliant GPS unit 150, a conventional GPS unit which is not compliant with the DSRC standard is unable to determine the location of a vehicle 123 with lane-level accuracy. For example, a typical roadway lane is approximately 3 meters wide. However, a conventional GPS unit only has an accuracy of plus or minus 10 meters relative to the actual location of the vehicle 123. As a result, such conventional GPS units are not sufficiently accurate to identify a lane of travel for a vehicle 123 based on GPS data alone; instead, systems having only conventional GPS units must utilize sensors such as cameras to identify the vehicle's 123 lane of travel. Identifying a lane of travel of a vehicle is beneficial, for example, because in some embodiments it affects the wattage of electricity provided to a street light 111 so that the street light 111 may use an amount of electricity which is necessary to cast light into a vehicle's 123 lane of travel, and no more, thereby resulting in significant energy savings. If the vehicle 123 is traveling in a lane furthest from the street light 111, this may not matter in terms of energy savings. However, if the vehicle 123 is traveling in a lane that is nearer the street light 111 (while no other vehicles are on the roadway at the same time), then this may enable the street light 111 to use significantly less energy to provide illumination for the vehicle's 123 lane of travel while leaving the other lanes of travel unillumined by the street light 111.

In some embodiments, the vehicle 123 may include a sensor set. The sensor set may include one or more sensors that are operable to measure the physical environment outside of the vehicle 123. For example, the sensor set may include one or more sensors that record one or more physical characteristics of the physical environment that is proximate to the vehicle 123. The memory 127 may store sensor data that describes the one or more physical characteristics recorded by the sensor set. The sensor data may be used by the light system 199 to confirm or deny the GPS data 186 or other data stored in the memory 127. For example, the GPS data 186 may indicate that the vehicle 123 is located near a particular landmark, and the sensor data may include a digital image that includes the particular landmark, thereby confirming the accuracy of the GPS data 186.

In some embodiments, the sensor set of the vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The vehicle 123 may include one or more memories 127.

The memory 127 of the vehicle 123 stores one or more of the following types of digital data: subscription data 194; payment data 188; GPS data 186; and BSM data 195.

In some embodiments, the memory 127 stores, as digital data, any data described herein. In some embodiments, the memory 127 stores any data that is necessary for the light system 199 to provide its functionality.

The BSM data 195 is digital data that is received in a BSM message or transmitted in a BSM message. The BSM data 195 is depicted in FIGS. 5 and 6. The BSM data 195 is described in more detail below with reference to FIGS. 5 and 6. In some embodiments, the memory 127 stores DSRC data which is digital data received in a DSRC message or transmitted as a DSRC message. The DSRC data describes any information that is included in the BSM data 195. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the BSM data 195 is received by the edge server 107 in a BSM message which is broadcasted by the vehicle 123. This broadcast may occur at regular intervals. In this way the edge server 107 may identify or estimate the oncoming presence of the vehicle 123 at a location that is proximate to the street light 111 or the edge server 107.

In some embodiments, the BSM data 195 includes one or more of the following: (1) GPS data 186 for the DSRC-equipped electronic device that transmitted the BSM message which included the BSM data 195 [e.g., the GPS data 186 for the vehicle 123]; and (2) a unique vehicle identifier for the DSRC-equipped electronic device that transmitted the BSM message which included the BSM data 195 [e.g., a Vehicle Identification Number (VIN number) of the vehicle 123 that transmitted the BSM]. The GPS data 186 included in the BSM data 195 describes the geographical location of the vehicle that transmitted the BSM message which included the BSM data 195.

The GPS data 186 is digital data that describes a geographic location of the vehicle 123. In some embodiments, the GPS data 186 describes the geographic location of the vehicle 123 with lane-level precision.

The subscription data 194 and the payment data 188 are now described with reference to embodiments of the light systems 199 of the endpoints that provide a subscription-based lighting policy (see, e.g., FIG. 4).

A subscription-based lighting policy includes the light system 199 of the edge server 107 controlling the operation of the street light 111 based on a preference of the user 104 of the vehicle 123. Before operating the vehicle 123, the user 104 transmits their subscription data 194, via the network 105, to the cloud server 109. For example, the user 104 uses the user interface device 145 or a smartphone app on their smartphone (not pictured) to input and transmit the subscription data 194 to the cloud server 109. The subscription data 194 is digital data that describes one or more of the following: (1) the vehicle's 123 route including times of departure; (2) the VIN number for the vehicle 123; and (3) the lighting preferences of the user 104.

The cloud server 109 receives the subscription data 194 from the network 105. The light system 199 of the cloud server 109 analyzes the subscription data 194 and determines a cost for a subscription that is consistent with the subscription data 194. The light system 199 of the cloud server 109 causes the cloud server 109 to transmit a wireless message to a processor-based computing device of the user 104 (e.g., to the user's vehicle 123, smartphone, tablet computer, laptop, etc.) that includes the cost information for the subscription. The user 104 can then confirm their subscription by inputting their payment information.

The payment information includes, for example, bank information or credit card information that enables the payment system 187 of the cloud server 109 to process a payment for the subscription from a financial account of the user 104. The payment data 188 is digital data that describes the payment information of the user 104. The cloud server 109 receives the payment data 188 from the network 105. The payment system 187 of the cloud server 109 processes the payment for the subscription based on the payment information.

After processing the payment, the light system 199 of the cloud server 109 updates the lighting policy for the edge server 107 (as well as other edge servers 107) which is located along the driving route (e.g., the vehicle's 123 route as described by the subscription data 194) with the user's 104 preferences and the estimated time when the vehicle 123 will pass through and near the edge server 107 (as well as the other edge servers 107 located along the driving route). The lighting policy is described by the policy data 171. The cloud server 109 updates the lighting policy for the edge server 107 by providing the edge server 107 with policy data 171 via the network 105.

In some embodiments, the lighting policy described by the policy data 171 may also include a unique identifier for the user's 104 vehicle 123 (e.g., the VIN number for the vehicle 123) that is associated with the lighting policy described by the policy data 171. The light system 199 of the edge server 107 uses this unique identifier to determine when to apply a lighting policy described by the policy data 171. For example, the edge server 107 receives V2I wireless messages from the vehicle 123 as it approaches the edge server 107, and these V2I wireless messages include a unique identifier of the vehicle 123 that transmits the V2I wireless message. For example, the vehicle 123 broadcasts a BSM including BSM data 195 that includes the VIN number for the vehicle 123 at some user-defined interval (e.g., the default setting prescribed by the DSRC standard is to broadcast a new BSM once every 0.10 seconds). The light system 199 of the edge server 107 receives the BSM, parses out the unique identifier for the vehicle 123 from the BSM data and then compares this unique identifier to the unique identifier of the policy data 171 stored by the edge server 107. If the unique identifiers match, then the light system 199 of the edge server 107 determines to apply the lighting policy described by the policy data 171 until the vehicle 123 passes by the street light 111. When the vehicle 123 approaches the edge server 107, the light system 199 of the edge server 107 identify the vehicle 123 through the V2I communications it transmits, and then operate the street light 111 according to the lighting policy described by the policy data 171 that includes the vehicle's 123 unique identifier and describes the user's 104 preferences for operating the street light 111. The light system 199 of the edge server 107 then causes the street light 111 to be turned off as the vehicle 123 leaves the geographic region that is capable of being illumined by the street light 111. In some embodiments, after the vehicle 123 completes the route described by the subscription data 194, the light system 199 of the cloud server 109 causes an invoice to be sent to the user 104 for the light service provided to the user 104.

The communication unit 145A transmits and receives data to and from a network 105 or to another communication channel. In some embodiments, the communication unit 145A may include a DSRC transceiver, a DSRC receiver and other hardware or software necessary to make the ego vehicle 123 a DSRC-equipped device.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes a V2I radio 144A. The V2I radio 144A is a hardware unit that includes a transmitter and a receiver that is operable to send and receive wireless messages via any V2I protocol. For example, the V2I radio 144A is operable to send and receive wireless messages via DSRC. The V2I transmitter is operable to transmit and broadcast DSRC messages over the 5.9 GHz band. The V2I receiver is operable to receive DSRC messages over the 5.9 GHz band. The V2I radio includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages ("PSM" if singular, or "PSMs" if plural) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs.

In some embodiments, the V2I radio 144A includes a non-transitory memory which stores digital data that controls the frequency for broadcasting BSM messages. In some embodiments, the non-transitory memory stores a buffered version of the GPS data 186 for the vehicle 123 so that the GPS data 186 for the vehicle 123 is broadcast as an element of the BSM messages which are regularly broadcast by the V2I radio 144A.

In some embodiments, the V2I radio 144A includes any hardware or software which is necessary to make the vehicle 123 compliant with the DSRC standards. In some embodiments, the DSRC-compliant GPS unit 150 is an element of the V2I radio 144A.

In some embodiments, the light system 199 includes code and routines that are operable, when executed by the processor 125, to cause the processor 125 to execute one or more of the steps of the flow processes 300, 400 described below with reference to FIGS. 4 and 5.

In some embodiments, the light systems 199 of the vehicle 123, cloud server 109, edge server 107 and street light 111 may be implemented using hardware including a field-programmable gate array ("FPGA") or an application-specific integrated circuit ("ASIC"). In some other embodiments, the light system 199 may be implemented using a combination of hardware and software.

In some embodiments, the light system 199 is stored in a combination of the devices (e.g., servers or other devices). For example, as depicted in FIG. 1, the network 105 includes the following example endpoints: the vehicle 123; the cloud server 109; the edge server 107; and the street light 111. In some embodiments, each of these endpoints is a different layer in the system architecture described herein and each endpoint includes a software client that enables that endpoint to provide its functionality to the system architecture. In some embodiments, the light system 199 for each endpoint includes the software client for that endpoint. For example, as depicted in FIG. 1: the light system 199 of the vehicle 123 is the software client for that endpoint; the light system 199 of cloud server 109 is the software client for that endpoint; the light system 199 of the edge server 107 is the software client for that endpoint; and the light system 199 of the street light 111 is the software client for that endpoint. The light systems 199 are depicted in FIG. 1 with dashed lines, and as being located at various endpoints, to indicate that, in some embodiments, different endpoints include a non-transitory memory storing code and routines that includes some or all of the light system 199 so that the functionality of the light system 199 is distributed among the endpoints of the embodiment depicted in FIG. 1.

Embodiments of the light system 199 are described in more detail below with reference to the other endpoints (e.g., the cloud server 109, the edge server 107 and the street light 111) as well as FIGS. 2, 3 and 4.

The cloud server 109 is a processor-based computing device. For example, the computing device may include a standalone hardware server. In some embodiments, the cloud server 109 may be communicatively coupled to the network 105. The cloud server 109 includes network communication capabilities. The cloud server 109 is operable to send and receive wireless messages via the network 105.

As depicted, the cloud server 109 includes the following elements: the light system 199 of the cloud server 109; a payment system 187; a communication unit 145B; local data 170; policy data 171; subscription data 194; and payment data 188.

In some embodiments, the local data 170, policy data 171, subscription data 194 and payment data 188 are stored on a non-transitory memory of the cloud server 109 that is similar to the memory 127 described above for the vehicle 123. In some embodiments, the light system 199 and the payment system 187 include software that is stored on the memory of the cloud server 109.

In some embodiments, the cloud server 109 includes a processor similar to the processor 125 described above for the vehicle 123. In some embodiments, the processor of the cloud server 109 is: communicatively coupled to the memory of the cloud server 109; and operable to access and execute the data and software stored on the memory of the cloud server 109.

The communication unit 145B includes functionality similar to the communication unit 145A described above with reference to the vehicle 123, and so, that description will not be repeated here. The subscription data 194 and the payment data 188 were described above with reference to the vehicle 123, and so, those descriptions will not be repeated here. The communication unit 145A of the vehicle 123 transmits the subscription data 194 and the payment data 188 to the network 105. The communication unit 145B of the cloud server 109 receives the subscription data 194 and the payment data 188 from the network 105 and stores the subscription data 194 and the payment data 188 in a non-transitory memory of the cloud server 109.

The local data 170 is digital data that describes sensor measurements recorded by the sensors of the edge server 107 (e.g., by one or more sensors of the sensor set 185) and transmitted to the cloud server 109 via the network 105 by the light system 199 of the edge server 107. In some embodiments, the local data 170 is digital data that describes local information such as weather conditions or road conditions (e.g., obstacles or construction or accident events). The local data 170 includes digital data that describes the geographic location of the edge server 107 (e.g., GPS data or a unique identifier which is known to be associated with a particular geographic location or geographic region). In this way the light system 199 of the cloud server 109 can analyze the local data 170 and determine which geographic location it describes.

The policy data 171 is digital data that describes a lighting policy for operating the street light 111. In general, there are two types of lighting policies that are described by the policy data 171: a local event-based lighting policy; and a subscription-based lighting policy. Each of these types of lighting policies are described in more detail below with reference to FIGS. 3 and 4 according to some embodiments.

The payment system 187 includes software that is operable, when executed by a processor of the cloud server 109, to cause the processor to process one or more payments based on the payment data 188. For example, the payment system 187 causes the communication unit 145B to securely transmit the payment data 188 and financial account information for an operator of the cloud server 109 to a bank or credit card server via the network 105 and process a payment from the user 104 to the operator of the cloud server 109 based on the payment data 188 and the financial account information for the operator of the cloud server 109.

The light system 199 of the cloud server 109 includes software that is operable, when executed by a processor of the cloud server 109, to cause the processor to generate policy data 171 describing a lighting policy based on one or more of the following: the local data 170; the subscription data 194; and a goal such as reducing an expense associated with illuminating the street light 111 when a vehicle 123 is not proximately located near the street light 111 such that the vehicle 123 benefits from the illumination provided by the street light 111. The functionality of the light system 199 of the cloud server 109 is described in more detail below according to some embodiments with reference to FIGS. 2-4.

The edge server 107 is a processor-based computing device. For example, the computing device may include a standalone hardware server. In some embodiments, the edge server 107 is an element of a RSU, or some other electronic infrastructure device, that is located proximate to the location of the street light 111. In some embodiments, the edge server 107 may be communicatively coupled to the network 105. The edge server 107 includes network communication capabilities. The edge server 107 is operable to send and receive wireless messages via the network 105.

The edge server 107 is communicatively coupled to the street light 111 via a wired or wireless communication channel and operable to control the operation of the street light 111 based on messages provided to the street light 111 via the communication channel. For example, the edge server 107 is operable to control whether the street light 111 is illumined, the brightness of the street light 111 when illumined and any other variable associated with the operation of the street light 111. In some embodiments, the edge server 107 is an element of the street light 111.

As depicted, the edge server 107 includes the following elements: the light system 199 of the edge server 107; a sensor set 185; local data 170; a communication unit 145C including a V2I radio 144B; and policy data 171.

In some embodiments, the local data 170 and the policy data 171 are stored on a non-transitory memory of the edge server 107 that is similar to the memory 127 described above for the vehicle 123. In some embodiments, the light system 199 of the edge server 107 includes software that is stored on the memory of the edge server 107.

In some embodiments, the edge server 107 includes a processor similar to the processor 125 described above for the vehicle 123. In some embodiments, the processor of the edge server 107 is: communicatively coupled to the memory of the edge server 107; and operable to access and execute the data and software stored on the memory of the edge server 107.

The communication unit 145C includes functionality similar to the communication unit 145A described above with reference to the vehicle 123, and so, that description will not be repeated here. The communication unit 145C includes a V2I radio 144B. The V2I radio 144B includes enables the edge server 107 to wirelessly communicate with the vehicle 123 via V2I communication. The V2I radio 144B provides functionality similar to the V2I radio 144A described above with reference to the vehicle 123, and so, that description will not be repeated here.

The local data 170 and the policy data 171 were described above with reference to the vehicle 123, and so, those descriptions will not be repeated here. The light system 199 of the edge server 107 causes the communication unit 145C of the edge server 107 to transmit the local data 170 to the cloud server 109 via the network 105. The communication unit 145C of the edge server 107 receives the policy data 171 generated by the light system 199 of the cloud server 109 from the network 105. The communication unit 145C of the edge server 107 stores the policy data 171 in the non-transitory memory of the edge server 107.

The sensor set 185 includes any sensors which are necessary to record the local information described by the local data 170. For example, the sensor set 185 includes one or more of the following: a rain gauge that is operable to measure liquid precipitation over a set period of time; a present weather/precipitation identification sensor that is operable to identify a presence of currently falling precipitation; a disdrometer that is operable to measure a drop size distribution of liquid precipitation; a transmissometer that is operable to measure visibility; a ceilometer that is operable to measure a cloud ceiling; a barometer that is operable to measure atmospheric pressure; a hygrometer that is operable to measure humidity; a thermometer that is operable to measure air temperature; an anemometer that is operable to measure wind speed; a pyranometer that is operable to measure solar radiation; a camera that is operable to capture images (e.g., images of obstacles, construction or accident events); and a radar sensor, LIDAR sensor or some other range finding sensor that is operable to identify an object and a range separating the object from the range finding sensor. The local data 170 includes digital data that describes the measurements, identifications and images that measured by the sensors included in the sensor set 185. In some embodiments, the measurements, identifications and images captured by the sensors of the sensor set 185 are digitally stamped with digital data describing a geographic location of the edge server 107.

The light system 199 of the edge server 107 includes code and routines that are operable, when executed by a processor of the edge server 107, to cause the processor to execute one or more of the following steps: cause the sensor set 185 to record the local data 170; cause the communication unit 145C to transmit the local data 170 to the cloud server 109 via the network 105; receive the policy data 171 from the network 105; analyze the policy data 171 to identify a lighting policy to be applied to the operation of the street light 111; monitor for a presence of the vehicle 123 (e.g., the V2I radio 144B monitors for V2I messages transmitted by vehicle 123); responsive to the presence of the vehicle 123, control the operation of the street light 111 so that the street light 111 is operated in a manner that conforms to the lighting policy described by the policy data 171; monitor for the vehicle 123 to leave the region of the street light 111 (e.g., based on images of the region, a V2I message received from the vehicle 123 or a lack of V2I messages being received from the vehicle 123, such as a lack of a BSM being received from the vehicle 123); and, responsive to the vehicle 123 leaving the region of the street light 111, turn off the street light 111.

In some embodiments, the light system 199 of the edge server 107 generates command data 173 and transmits electronic messages (e.g., wired or wireless) to the street light 111 that include the command data 173. The command data 173 is digital data that describes an instruction for whether the street light 111 should operate, and if so, how the street light 111 should operate. For example, the instruction describes that the street light 111 should be illumined and at a particular brightness level. The brightness level may be specified as a non-negative percentage that is less than or equal to 100%. In another example, the instruction describes that the street light 111 should not be illumined (e.g., because the light system 199 of the edge server 107 determines that the vehicle 123 has left a vicinity of the street light 111).

In some embodiments, the light system 199 of the street light 111 records a duration that the street light 111 was operated and a wattage of electricity used by the street light 111 while illumined and transmits energy data 172 to the edge server 107. The energy data 172 is digital data that describes one or more of the following: the duration that the street light 111 was operated; and the wattage of electricity used by the street light 111 while illumined. The light system 199 of the edge server 107 transmits the energy data 172 to the cloud server 109 via the network 105. The communication unit 145B of the cloud server 109 stores the energy data 172 in the non-transitory memory of the cloud server 109. The light system 199 of the cloud server 109 may analyze the energy data 172 and modify the policy data 171 based on the energy data 172, for example, because the energy data 172 may indicate that not enough energy was saved to meet the goal of conserving energy usage and reducing energy costs. In this way the energy data 172 provided by the edge server 107 provides a feedback loop that improves the performance of the street light 111 so that the street light 111 uses less energy over time while still maintaining a safe, illuminated environment for the operation of the vehicle 123 at night.

The functionality of the light system 199 of the edge server 107 is described in more detail below according to some embodiments with reference to FIGS. 2-4.

The street light 111 is a processor-based computing device including one or more electrical bulbs, light emitting diodes (LEDs) or some other device that is operable to provide illumination (and not traffic signals or other types of light-based signals) for a roadway environment. The street light 111 is not a traffic light, traffic signal or some other signaling device because the street light 111 does not provide driving instructions, driving information or light-based signals to a driver of a vehicle. Instead, the street light 111 provides illumination for the roadway environment when instructed to do so by the edge server 107.

The street light 111 includes a processor similar to the processor 125 described above with reference to the vehicle 123, and so that description will not be repeated here. The street light 111 includes a non-transitory memory similar to the memory 127 described above with reference to the vehicle 123, and so that description will not be repeated here.

In some embodiments, the street light 111 may be communicatively coupled to the network 105. The street light 111 includes network communication capabilities. The street light 111 is operable to send and receive wireless messages via the network 105.

The street light 111 is communicatively coupled to the edge server 107 via a wired or wireless communication channel. The operation of the street light 111 is controlled by the edge server 107. The street light 111 is operable to receive electronic messages from the edge server 107 and operate in compliance with these messages.

As depicted, the street light 111 includes the following elements: the light system 199 of the street light 11; a communication unit 145D; the energy data 172; and the command data 173.

In some embodiments, the energy data 172 and the command data 173 are stored on a non-transitory memory of the street light 111 that is similar to the memory 127 described above for the vehicle 123. In some embodiments, the light system 199 of the street light 111 includes software that is stored on the memory of the light system 199.

In some embodiments, the street light 111 includes a processor similar to the processor 125 described above for the vehicle 123. In some embodiments, the processor of the street light 111 is: communicatively coupled to the memory of the street light 111; and operable to access and execute the data and software stored on the memory of the street light 111.

The communication unit 145D includes functionality similar to the communication unit 145A described above with reference to the vehicle 123, and so, that description will not be repeated here.

The energy data 172 and the command data 173 were described above with reference to the vehicle 123, and so, those descriptions will not be repeated here. The communication unit 145D of the street light 111 receives the command data 173 generated by the light system 199 of the edge server 107 from the network 105 or a wired communication channel shared with the edge server 107. The communication unit 145D of the street light 111 stores the command data 173 in the non-transitory memory of the street light 111. The light system 199 of the street light 111 causes the communication unit 145D of the street light 111 to transmit the energy data 172 to the edge server 107 via the network 105 or the wired communication channel shared with the edge server 107.

The functionality of the light system 199 of the street light 111 is described in more detail below according to some embodiments with reference to FIGS. 2-4.

Example Computer System

Figure 2:
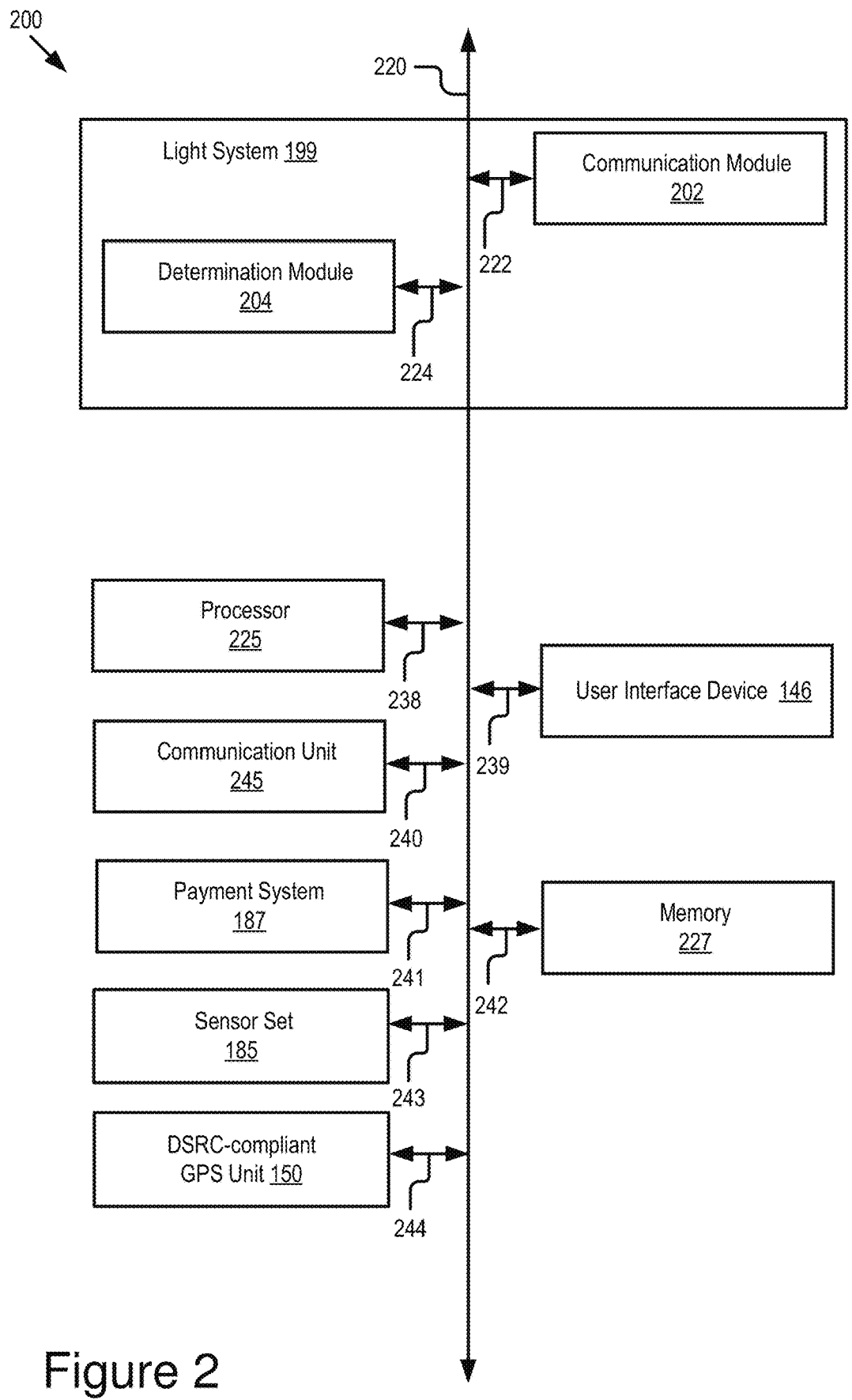
FIG. 2 is a block diagram illustrating an example computer system including the light system according to some embodiments.

Referring now to FIG. 2, depicted is a block diagram illustrating an example computer system 200 including the light system 199 according to some embodiments. FIG. 1 depicts the light system 199 distributed across multiple endpoints. FIG. 2 depicts the light system 199 as an element of a single computer system 200. Accordingly, some of the elements of the computer system 200 may be included in multiple endpoints as depicted in FIG. 1, or absent from some of the endpoints depicted in FIG. 1.

For example, in some embodiments both the light system 199 of the cloud server 109 and the light system 199 of the edge server 107 include a processor 225, a communication unit 245 and a memory 227; however, the light system 199 of the cloud server 109 does not include a sensor set 185 and the light system 199 of the edge server 107 does not include a payment system 187. Similarly, in some embodiments the light system 199 of the vehicle 123 includes a processor 225, a communication unit 245, a memory 227, a DSRC-compliant GPS unit 150 and a user interface device 146, but the light system 199 of the vehicle 123 does not include a payment system 187.

In some embodiments, the computer system 200 may include a special-purpose computer system that is programmed to perform one or more steps of one or more of the flow processes 300, 400 described below with reference to FIGS. 3 and 4.

In some embodiments, the computer system 200 is an onboard vehicle computer of the vehicle 123. In some embodiments, the computer system 200 is an onboard unit of the vehicle 123. In some embodiments, the computer system 200 is an ECU, head unit or some other processor-based computing device of the vehicle 123. In some embodiments, the computer system 200 is the cloud server 109. In some embodiments, the computer system 200 is the edge server 107. In some embodiments, the computer system 200 is the street light 111.

The computer system 200 may include one or more of the following elements according to some examples: the light system 199; the processor 225; the user interface device 146; the communication unit 245; the payment system 187; the memory 227; the sensor set 185; and the DSRC-compliant GPS unit 150. The components of the computer system 200 are communicatively coupled by a bus 220.

In the illustrated embodiment, the processor 125 is communicatively coupled to the bus 220 via a signal line 238. The user interface device 146 is communicatively coupled to the bus 220 via a signal line 239. The communication unit 245 is communicatively coupled to the bus 220 via a signal line 240. The payment system 187 is communicatively coupled to the bus 220 via a signal line 241. The memory 127 is communicatively coupled to the bus 220 via a signal line 242. The sensor set 185 is communicatively coupled to the bus 220 via a signal line 243. The DSRC-compliant GPS unit 150 is communicatively coupled to the bus 220 via a signal line 244.

The following elements of the computer system 200 were described above with reference to FIG. 1, and so, those descriptions will not be repeated here: the light system 199; the user interface device 146; the payment system 187; the sensor set 185; and the DSRC-compliant GPS unit 150.

The processor 225 provides similar functionality as the processor 125 described above with reference to FIG. 1, and so, that description will not be repeated here. The communication unit 245 provides similar functionality as the communication unit 245 described above with reference to FIG. 1, and so, that description will not be repeated here. The memory 227 provides similar functionality as the memory 127 described above with reference to FIG. 1, and so, that description will not be repeated here.

The memory 227 may store any of the data described above with reference to FIG. 1 or below with reference to FIGS. 2-6. The memory 227 may store any data needed for the computer system 200 to provide its functionality.

In the illustrated embodiment shown in FIG. 2, the light system 199 includes a communication module 202 and a determination module 204.

Figure 3:
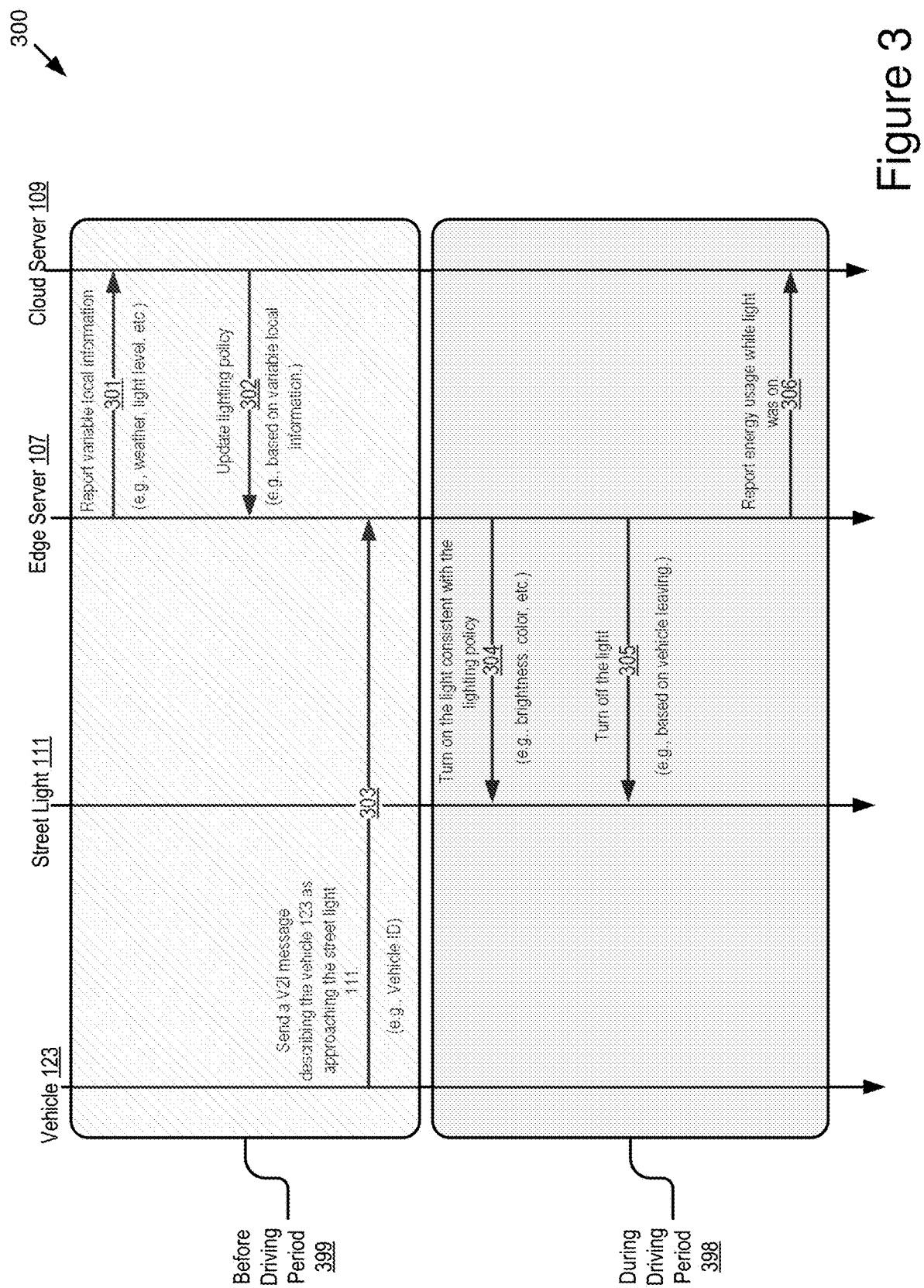
FIG. 3 depicts a flow process for one or more light systems to implement a local event-based lighting policy according to some embodiments.
Figure 4:
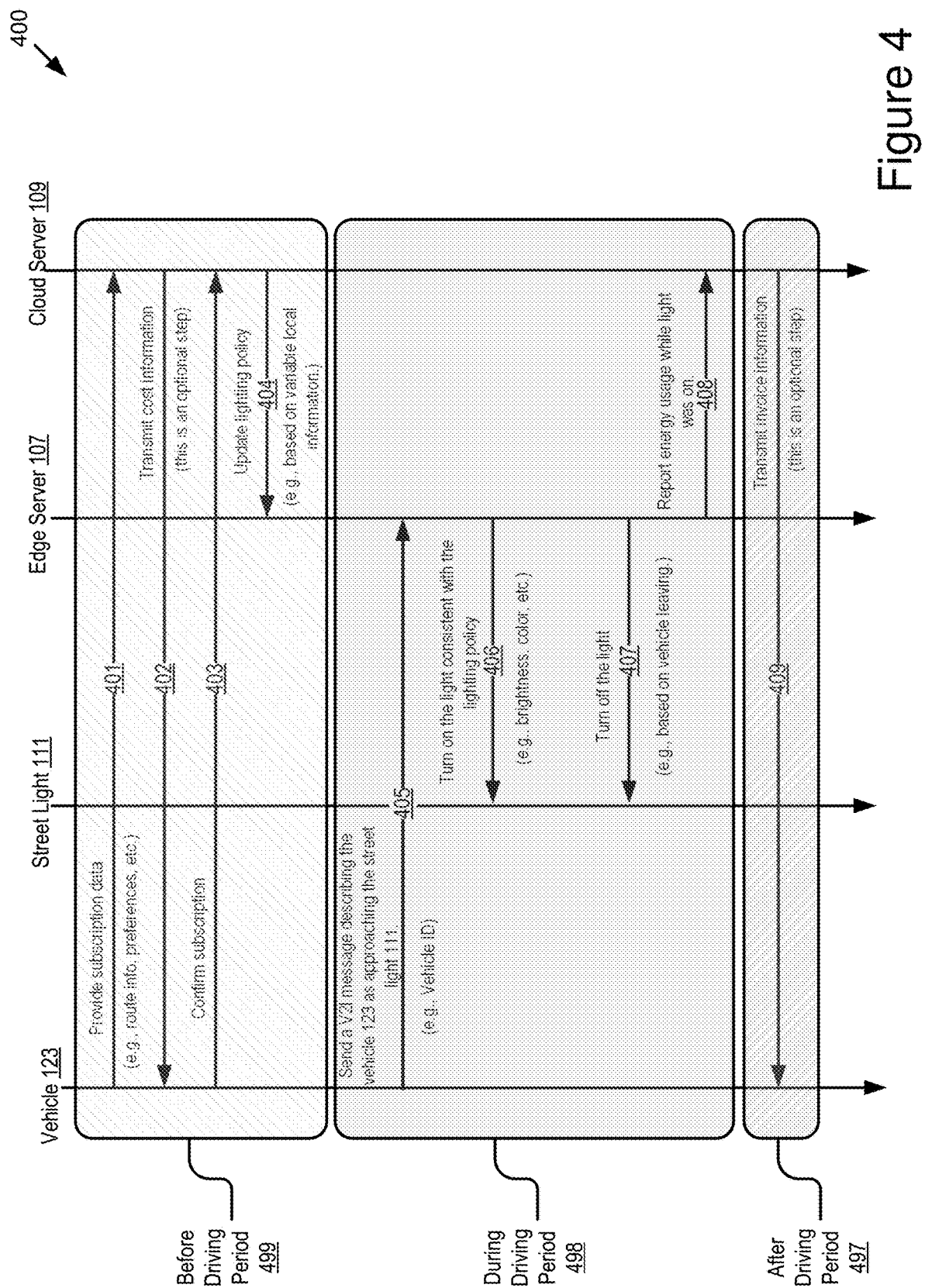
FIG. 4 depicts a flow process for one or more lights systems to implement a subscription-based lighting policy according to some embodiments.

The communication module 202 can be software including routines for handling communications between the light system 199 and other components of one or more of the following: the computer system 200; the operating environment 100 of FIG. 1; the flow process 300 of FIG. 3; and the flow process 400 of FIG. 4.

In some embodiments, the communication module 202 can be a set of instructions executable by the processor 225 to provide the functionality described below for handling communications between the light system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, one or more types of digital data stored on the memory 127. The communication module 202 may send or receive any of the digital data or messages described above with reference to FIG. 1, or below with reference to FIGS. 2-6, via the communication unit 245.

In some embodiments, the communication module 202 receives data from components of the light system 199 and stores the data in the memory 227 (or a buffer or cache of the memory 227, or a standalone buffer or cache which is not depicted in FIG. 2). For example, the communication module 202 receives the subscription data 194 and transmits the policy data 171.

In some embodiments, the communication module 202 may handle communications between components of the light system 199. For example, the communication module 202 transmits the subscription data 194 or local data 170 to the determination module 204.

The determination module 204 can be software including routines for executing one or more of the steps of the flow processes 300, 400 described below with reference to FIGS. 3 and 4.

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Example Processes

FIG. 3 depicts a flow process 300 for one or more light systems to implement a local event-based lighting policy according to some embodiments. The flow process 300 is now described with reference to both FIG. 3 and FIG. 1. For example, the four light systems 199 of the endpoints depicted in FIG. 1 cooperate with one another to execute the flow process 300 and thereby provide a light service in accordance with a local event-based lighting policy.

In some embodiments, a local event-based lighting policy includes an edge server 107 controlling the operation of the street light 111 based on: a presence of the vehicle 123 (e.g., as indicated by receipt of a BSM broadcast by the vehicle 123 or some other indication that the vehicle 123 is present in the vicinity of the street light 111); and the local information described by the local data 170 that is recorded by the edge server 107 that controls the operation of the street light 111. The edge server 107 includes a light system 199, a process similar to the processor 125 and a non-transitory memory similar to the memory 127.

A vicinity of a street light includes an area that is capable of being illumined by the street light 111 or a V2I communication range of the vehicle 123. For example, the range for DSRC is 300 to 500 feet in urban areas, or up to 1,500 to 3,000 feet in rural areas.

In some embodiments, the light system 199 of the edge server 107 includes software which is stored on the memory 127 of the edge server 107. The software included in the light system 199 of the edge server 107 is operable, when executed by the processor of the edge server 107, to cause the processor of the edge server 107 to execute steps including one or more of the following: (1) controlling the operation of the sensors included in the sensor set 185 so that local data 170 is acquired; (2) controlling the operation of the communication unit 145C so that the local data 170 is wirelessly transmitted to the cloud server 109 via the network 105; (3) receiving policy data 171 from the network 105, where the policy data 171 is generated by the light system 199 of the cloud server 109 based at least in part on the local data 170 [and optionally energy data 172 previously received from the feedback loop]; (4) analyzing the policy data 171 to determine the lighting policy described by the policy data 171; (5) wirelessly communicating with the vehicle 123 to identify its presence; and (6) communicating with the street light 111 to control the operation of the street light 111 in a manner consistent with the lighting policy described by the policy data 171 so that the lighting policy is implemented by the edge server 107.

In some embodiments, the operation of the street light 111 is not controlled by the edge server 107 based on a signal from a photovoltaic cell indicating a state of ambient light. The state of ambient light describes a current presence of ambient light in an environment, a current absence of ambient light in the environment or an amount of ambient light in the environment. For example, the street light 111 is not turned on because a sensor detects that the light level proximate to the street light 111 has dropped below some threshold that triggers the street light 111 being turned on. In other words, the edge server 107 determines to turn the street light 111 on based on the wireless message received from the vehicle 123, and not a light level in the environment proximate to one or more of the street light 111, the edge server 107 and the vehicle 123.

In some embodiments, the presence of the vehicle 123 is not determined by the light system 199 of the edge server 107 based on an image of the vehicle 123 which is recorded by one or more sensors of the sensor set 185. For example, the light system 199 of the edge server 107 determines a presence of the vehicle 123 based on a wireless message received from the vehicle 123, and not an image of the vehicle 123. In some embodiments, the presence of the vehicle 123 is not determined based on any sensor measurement recorded by a sensor of the sensor set 185.

In some embodiments, the light system 199 of the edge server 107 regularly sends local data 170 to the cloud server 109 via the network 105. The local data 170 is digital data that describes local information such as weather conditions or road conditions (e.g., obstacles or construction or accident events). The local data 170 includes digital data that describes the geographic location of the edge server 107 (e.g., GPS data or a unique identifier which is known to be associated with a particular geographic location or geographic region).

In some embodiments, the cloud server 109 includes a version or instance of the light system 199. The light system 199 of the cloud server 109 is software which is stored on the memory 127 of the cloud server 109. The software included in the light system 199 of the cloud server 109 is operable, when executed by the processor of the cloud server 109, to cause the processor of the cloud server 109 to execute steps including one or more of the following: (1) receiving local data 170 from the edge server 107 [or a group of edge servers 107 in a geographic region]; (2) determining a lighting policy for the edge server 107 [or the group of edge servers 107 within the geographic region] based on the local data 170 and, optionally, one or more goals such as reducing energy costs or reducing vehicle accidents; (3) transmitting policy data 171 to the edge server 107 [or the group of edge servers 107]; and (4) updating the lighting policy for the geographic region as new information is received [e.g., as new local data 170 or energy data 172 is received].

An example of the light system 199 of the cloud server 109 determining a lighting policy is now described according to some embodiments. The light system 199 of the cloud server 109 determines appropriate lighting settings (such as brightness, colors or directions) for the geographic location or the geographic region based on the local data 170 provided by a particular edge server 107 (or the local data 170 provided by multiple edge servers 107 within a particular geographic region). For example, the light system 199 of the cloud server 109 determines that rainy conditions or slick roads described by the local data 170 justify the expense of brighter lights, or may benefit from a different color of light. Other examples of modifying the lighting settings based on various local conditions described by the local data 170 are possible. The light system 199 of the cloud server 109 updates the lighting policy for the particular edge server 107 (or a particular group of edge servers 107 within a geographic region) based on the appropriate lighting settings. The light system 199 of the cloud server 109 then causes the communication unit 145B of the cloud server 109 to wirelessly transmit policy data 171 describing the lighting policy to the edge server 107 (or the group of edge servers 107 for a geographic region). The policy data 171 is digital data that describes the lighting policy.

In some embodiments, the edge server 107 receives the policy data 171. The light system 199 of the edge server 107 monitors for a presence of a vehicle 123. Whenever the vehicle 123 is approaching to the region of the edge server 107 (as indicated, for example, by sensor measurements and V2I communications with the vehicle 123), the light system 199 of the edge server 107 selectively turns one or more street lights 111 on or off according to the lighting setting described by the policy data 171 as the vehicle 123 moves along its path.

In some embodiments, the light system 199 of the edge server 107 records energy data 172 describing, among other things, the energy usage of the street lights 111, and then reports the energy data 172 to the cloud server 109 for analysis by the light system 199 of the cloud server 109 so that the policy data 171 is improved. For example, the light system 199 of the cloud server 109 includes a machine learning algorithm which analyzes the energy data 172 and determines ways to improve the lighting policy so that energy usage is reduced further or less vehicle accidents occur.

In some embodiments, the energy data 172 is recorded by a light system 199 of the street light 111 and relayed to the edge server 107 via a wired or wireless communication channel shared with the edge server 107. The edge server 107 then transmits the energy data 172 to the cloud server 109 for analysis and improvement of the policy data 171.

Referring now to the flow process 300, a before driving period 399 and a during driving period 398 are depicted. The before driving period 399 includes steps 301, 302 and 303. The during driving period 398 includes steps 304, 305 and 306.

At step 301, local data 170 is provided to the cloud server 109 by the edge server 107.

At step 302, the cloud server 109 provides policy data 171 to the edge server 107.

At step 303, the vehicle 123 transmits a V2I message to the edge server 107. The V2I message may include a unique identifier of the vehicle 123.

At step 304, the street light 111 is turned on by the edge server 107 and operated in a manner consistent with the lighting policy described by the policy data 171.

At step 305, the street light 111 is turned off by the edge server 107.

At step 306, energy data 172 is transmitted to the cloud server 109 by the edge server 107.

In some embodiments, an additional step occurring between steps 305 and 306 may include the street light 111 providing the energy data 172 to the edge server 107.

In some embodiments, the light system 199 of the street light 111 determines the energy data 172 and sends the energy data 172 to the cloud server 109 directly without first sending the energy data 172 to the edge server 107.

Referring now to FIG. 4, depicted is a flow process 400 for one or more lights systems 199 to implement a subscription-based lighting policy according to some embodiments.

In some embodiments, a subscription-based lighting policy includes the lighting system 199 of the edge server 107 controlling a street light 111 based on a preference of a user 104 of the vehicle 123. Before the vehicle 123 is operated, the user 104 causes their subscription data 194 to be transmitted to the cloud server 109. For example, the user 104 uses a smartphone application on their smartphone to input and transmit the subscription data 194 to the cloud server 109 via the network 105. The subscription data 194 is digital data that describes one or more of the following: (1) the route of the vehicle 123, including times of departure; (2) the VIN number for the vehicle 123; and (3) the lighting preferences of the user 104.

In some embodiments, the cloud server 109 receives the subscription data 194 from the network 105. The light system 199 of the cloud server 109 analyzes the subscription data 194 and determines a cost for a subscription. The subscription is light service that is consistent with the subscription data 194. The light system 199 of the cloud server 109 causes the communication unit 145B to transmit the cost information to the user's 104 computer (e.g., their smartphone, an onboard vehicle computer of the vehicle 123, etc.). The user 104 can then confirm their subscription by inputting their payment information. The payment data 188 is digital data that describes the payment information of the user 104. The cloud server 109 receives the payment data 188 from the network 105. The light system 199 of the cloud server 109 includes a payment system 187 that is operable to process a payment based on the payment data 188. After processing the payment, the light system 199 of the cloud server 109 updates the lighting policy for one or more edge servers 107 which are located along the route described by the subscription data 194 to be consistent with the preferences of the user 104 as described by the subscription data 194. The lighting policy is described by one or more instances of policy data 171. The light system 199 of the cloud server 109 also updates the policy data 171 to include a description of the estimated time when the vehicle 123 will pass by each edge server 107. This time information is determined by the light system 199 of the cloud server 109 based on time information included in the subscription data 194. The lighting policy described by each instance of policy data 171 may also include a unique identifier for the vehicle 123 of the driver (e.g., the VIN number of the vehicle 123) which can be identified by the one or more edge servers 107 via V2I communication with the vehicle 123 as the vehicle 123 approaches the one or more edge servers 107.

In some embodiments, the vehicle 123 approaches the edge server 107 as it drives the route described by the subscription data 194. When the vehicle 123 approaches the edge server 107, the light system 199 of the edge server 107 identifies the presence of the vehicle 123 through the V2I communication with the vehicle 123; the light system 199 of the edge server 107 turn son the street light 111 according to the lighting policy described by the policy data 171 received from the cloud server 109. This lighting policy is consistent with the preferences of the user 104. The light system 199 of the edge server 107 causes the street light 111 to be turned off as the driver leaves the region. After completing the route, the cloud server 109 sends an electronic invoice to the computing device of the user 104.

Referring now to the flow process 400, a before driving period 499, a during driving period 498 and an after driving period 497 are depicted. The before driving period 499 includes steps 401, 402, 403 and 404. The during driving period 498 includes steps 405, 406, 407 and 408. The after driving period 497 includes step 409.

At step 401, the subscription data 194 is provided to the cloud server 109 by the onboard vehicle computer of the vehicle 123 or some other processor-based computing device of the user 104.

At step 402, the cost information is provided to the onboard vehicle computer of the vehicle 123 or some other processor-based computing device of the user 104.

At step 403, an electronic message confirming the subscription is transmitted to the cloud server 109 by the onboard vehicle computer of the vehicle 123 or some other processor-based computing device of the user 104.

At step 404, the cloud server 109 transmits updated policy data 171 to an edge server 107. The policy data 171 is updated to be consistent with the preferences of the user 104 as described by the subscription data 194.

At step 405, the vehicle 123 transmits a V2I message to the edge server 107. The V2I message may include a unique identifier of the vehicle 123.

At step 406, the street light 111 is turned on by the edge server 107 and operated in a manner consistent with the lighting policy described by the policy data 171.

At step 407, the street light 111 is turned off by the edge server 107.

At step 408, energy data 172 is transmitted to the cloud server 109 by the edge server 107.

At step 409, an electronic message including an invoice is transmitted to the onboard vehicle computer of the vehicle 123 or some other processor-based computing device of the user 104.

In some embodiments, an additional step occurring between steps 407 and 408 may include the street light 111 providing the energy data 172 to the edge server 107.

In some embodiments, the light system 199 of the street light 111 determines the energy data 172 and sends the energy data 172 to the cloud server 109 directly without first sending the energy data 172 to the edge server 107.

Referring now to FIG. 5, depicted is a block diagram illustrating an example of the BSM data 195 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints.

Referring now to FIG. 6, depicted is a block diagram illustrating an example of BSM data 195 according to some embodiments.

A BSM may include two parts. These two parts may include different BSM data 195 as shown in FIG. 6.

Part 1 of the BSM data 195 may describe one or more of the following: the GPS data of the vehicle; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving a wireless message from a connected vehicle that describes a heading of the connected vehicle;
   determining, based on the heading described in the wireless message, that the connected vehicle is approaching a street light; and
   transmitting a command to the street light based on a lighting policy and the connected vehicle approaching the street light, wherein the street light is operated consistent with the lighting policy and the lighting policy is operable to reduce an energy consumption of the street light while also providing illumination for the connected vehicle.

2. The method of claim 1, wherein the wireless message is a Dedicated Short-Range Communication (DSRC) message.

3. The method of claim 2, wherein the DSRC message is not one of the following: a WiFi message; a 3G message; a 4G message; a Long-Term Evolution (LTE) message; a millimeter wave communication message; a Bluetooth message; and a satellite communication.

4. The method of claim 1, wherein the lighting policy is determined by a cloud server.

5. The method of claim 1, wherein the street light does not receive the wireless message.

6. The method of claim 1, wherein the wireless message is received by an edge server that is communicatively coupled to the street light and operable to transmit the command to the street light consistent with the lighting policy.

7. The method of claim 1, wherein the lighting policy is determined at least in part on a preference of a user of the connected vehicle.

8. The method of claim 1, wherein the connected vehicle is an autonomous vehicle.

9. A system comprising:
   a processor communicatively coupled to a non-transitory memory storing computer code that is operable, when executed by the processor, to cause the processor to:
   receive a wireless message from a connected vehicle that describes a heading of the connected vehicle;
   determine, based on the heading described in the wireless message, that the connected vehicle is approaching a street light; and
   transmit a command to the street light based on a lighting policy and the connected vehicle approaching the street light, wherein the street light is operated by the processor consistent with the lighting policy and the lighting policy is operable to reduce an energy consumption of the street light while also providing illumination for the connected vehicle.

10. The system of claim 9, wherein the lighting policy is determined by a cloud server.

11. The system of claim 9, wherein the wireless message is received by an edge server that is communicatively coupled to the street light and operable to transmit the command to the street light consistent with the lighting policy.

12. The system of claim 9, wherein the street light is not controlled based on a signal from a photovoltaic cell indicating a state of ambient light.

13. The system of claim 9, wherein the determination that the connected vehicle is approaching the street light is not determined based on an image of the connected vehicle.

14. A computer program product comprising instructions that, when executed by one or more processors, cause the one or more processors to perform operations comprising:
   receiving a wireless message from a connected vehicle that describes a heading of the connected vehicle;
   determining, based on the heading described in the wireless message, that the connected vehicle is approaching a street light; and
   transmitting a command to the street light based on a lighting policy and the connected vehicle approaching the street light, wherein the street light is operated consistent with the lighting policy and the lighting policy is operable to reduce an energy consumption of the street light while also providing illumination for the connected vehicle.

15. The computer program product of claim 14, wherein the lighting policy is determined by a cloud server.

16. The computer program product of claim 15, wherein the street light generates energy data describing an energy usage of the street light and the energy data is provided to the cloud server in a feedback loop so that the lighting policy is revised based on the energy usage of the street light so that the energy usage is reduced while still providing sufficient illumination for the connected vehicle.

17. The computer program product of claim 14, wherein the connected vehicle is a Highly Autonomous Vehicle (HAV) and the lighting policy is configured based on an illumination requirement for an onboard sensor of the connected vehicle.

18. The computer program product of claim 14, wherein the connected vehicle is an autonomous vehicle that is not an HAV and the lighting policy is configured based on an illumination requirement for an onboard sensor of the connected vehicle.

19. The computer program product of claim 14, wherein the connected vehicle is an autonomous vehicle and transmitting the command to the street light improves a performance of the connected vehicle by enabling one or more onboard sensors of the connected vehicle to perceive a roadway environment that includes the street light and the connected vehicle because the lighting policy is configured based on one or more illumination requirements for the one or more onboard sensors of the connected vehicle.

20. The computer program product of claim 19, wherein the one or more illumination requirements for the one or more onboard sensors are wirelessly communicated by the connected vehicle to an edge server that includes the one or more processors that transmit the command to the street light.

* * * * *